(12) United States Patent
Husband et al.

(10) Patent No.: US 10,280,767 B2
(45) Date of Patent: May 7, 2019

(54) FAN HUB ATTACHMENT FOR LEADING AND TRAILING EDGES OF FAN BLADES

(71) Applicant: United Technologies Corporation, Farmington, CT (US)

(72) Inventors: Jason Husband, South Glastonbury, CT (US); James Glaspey, Farmington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 40 days.

(21) Appl. No.: 15/689,953

(22) Filed: Aug. 29, 2017

(65) Prior Publication Data

US 2019/0063236 A1  Feb. 28, 2019

(51) Int. Cl.
*F01D 5/30* (2006.01)
*B64C 11/04* (2006.01)
*F02C 7/04* (2006.01)

(52) U.S. Cl.
CPC ............ *F01D 5/3053* (2013.01); *B64C 11/04* (2013.01); *F02C 7/04* (2013.01)

(58) Field of Classification Search
CPC ......... F01D 5/30; F01D 5/3053; B64C 11/04; F02C 7/04
See application file for complete search history.

(56) References Cited

U.S. PATENT DOCUMENTS

| | | | |
|---|---|---|---|
| 3,476,484 A | 11/1969 | Brunsch | |
| 3,694,104 A | 9/1972 | Erwin | |
| 5,240,377 A | 8/1993 | Farr | |
| 5,370,501 A * | 12/1994 | Udall | F01D 5/30 416/216 |
| 7,399,159 B2 | 7/2008 | Matheny et al. | |
| 9,429,026 B2 | 8/2016 | Schreiber | |
| 2008/0226458 A1 | 9/2008 | Pierrot | |
| 2013/0315744 A1 | 11/2013 | Perdrigeon et al. | |
| 2016/0298642 A1 | 10/2016 | Perdrigeon et al. | |
| 2018/0094638 A1 * | 4/2018 | Eleftheriou | F04D 29/32 |

FOREIGN PATENT DOCUMENTS

JP  2014005834 A  1/2014
WO  2014088673 A2  6/2014

OTHER PUBLICATIONS

European Search Report for Application No. EP 18 19 1573.

* cited by examiner

*Primary Examiner* — Hieu T Vo (74) *Attorney, Agent, or Firm* — Cantor Colburn LLP (57) ABSTRACT

In one embodiment, a hub for a fan of a gas turbine engine is provided. The hub having: a plurality of attachment features located on an outer circumferential surface of the hub, wherein at least some of the plurality attachment features extend radially away from the outer circumferential surface and are axially aligned with each other and at least some of the plurality of attachment features extending radially away from the outer circumferential surface and are offset from each other, and wherein the plurality of attachment features have an opening configured to receive a portion of a pin; and wherein at least some of the plurality of attachment features are located on a forward leading edge of the hub.

20 Claims, 10 Drawing Sheets

FAN HUB ATTACHMENT FOR LEADING AND TRAILING EDGES OF FAN BLADES

BACKGROUND

Exemplary embodiments of the present disclosure are directed to fan hubs of gas turbine engines and more particularly a fan hub and attachments for leading and trailing edges of the fan blades.

Gas turbine engines, such as turbofan gas turbine engines, typically include a core engine having a fan section, a compressor section, a combustor section and a turbine section. During operation, air is pressurized in the compressor section and mixed with fuel in the combustor section for generating hot combustion gases. The hot combustion gases flow through the turbine section which extracts energy from the hot combustion gases to power the compressor section and drive the fan section.

The core engine includes an engine casing structure that includes a fan containment case (FCC) and a fan case downstream from the FCC. The FCC and the fan case surround the fan section of the gas turbine engine and contain the fan section components in the event of a fan blade out event. A fan blade out event occurs where a fan blade of the fan section becomes dislodged from the fan section and strikes the FCC.

Accordingly, it is desirable to mitigate the loading or stresses at the leading edge of the fan blade.

BRIEF DESCRIPTION

In one embodiment, a hub for a fan of a gas turbine engine is provided. The hub having: a plurality of attachment features located on an outer circumferential surface of the hub, wherein at least some of the plurality attachment features extend radially away from the outer circumferential surface and are axially aligned with each other and at least some of the plurality of attachment features extending radially away from the outer circumferential surface and are off set from each other, and wherein the plurality of attachment features have an opening configured to receive a portion of a pin; and wherein at least some of the plurality of attachment features are located on a forward leading edge of the hub.

In addition to one or more of the features described above, or as an alternative to any of the foregoing embodiments, the plurality of attachment features may be located on the forward leading edge of the hub extend axially away from the leading edge.

In addition to one or more of the features described above, or as an alternative to any of the foregoing embodiments, at least some of the plurality of attachment features are located on a trailing edge of the hub.

In addition to one or more of the features described above, or as an alternative to any of the foregoing embodiments, at least some of the plurality of attachment features are located on a trailing edge of the hub and the least some of the plurality of attachment features located on the trailing edge of the hub extend axially from the trailing edge of the hub.

In addition to one or more of the features described above, or as an alternative to any of the foregoing embodiments, the plurality of attachment features located on the outer circumferential surface of the hub are a plurality of walls axially spaced from each other that extend continuously about the outer circumferential surface of the hub.

In addition to one or more of the features described above, or as an alternative to any of the foregoing embodiments, the outer circumferential surface of the hub undulates.

In addition to one or more of the features described above, or as an alternative to any of the foregoing embodiments, the hub is conically shaped.

In addition to one or more of the features described above, or as an alternative to any of the foregoing embodiments, the outer circumferential surface of the hub has at least two different Gaussian curvatures.

In addition to one or more of the features described above, or as an alternative to any of the foregoing embodiments, the outer circumferential surface of the hub undulates.

In addition to one or more of the features described above, or as an alternative to any of the foregoing embodiments, the hub includes at least one fan blade, and the at least one fan blade has a plurality of connecting members extending from a bottom portion of the fan blade, the plurality of connecting members being configured to be secured to the plurality of attachment features by a pin.

In addition to one or more of the features described above, or as an alternative to any of the foregoing embodiments, the at least one fan blade has a plurality of connecting members and at least one of the plurality of connecting members being secured to at least one of the plurality of attachment features located on the leading edge of the hub.

In addition to one or more of the features described above, or as an alternative to any of the foregoing embodiments, the at least one fan blade has a protective member secured to a leading edge of the at least one fan blade wherein the protective member is secured to at least one of the plurality of attachment features located on the leading edge of the hub.

In addition to one or more of the features described above, or as an alternative to any of the foregoing embodiments, the at least one fan blade has a protective member secured to a trailing edge of the at least one fan blade and wherein the protective member is secured to at least one of the plurality of attachment features located on the trailing edge of the hub.

In addition to one or more of the features described above, or as an alternative to any of the foregoing embodiments, the at least one fan blade has a protective member secured to a trailing edge of the at least one fan blade and wherein the protective member is secured to at least one of the plurality of attachment features located on the trailing edge of the hub and wherein the at least one fan blade has a protective member secured to a leading edge of the at least one fan blade wherein the protective member secured to the leading edge of the at least one fan blade is secured to at least one of the plurality of attachment features located on the leading edge of the hub.

In yet another embodiment, a gas turbine engine is provided. The engine having: a fan hub; a plurality of blades secured to the fan hub via a plurality of attachment features located on an outer circumferential surface of the hub, wherein at least some of the plurality attachment features are axially aligned with each other and at least some of the plurality of attachment features are off set from each other, and wherein each of the plurality of attachment features have an opening configured to receive a portion of a pin for securing the plurality of blades to the fan hub; and wherein at least some of the plurality of attachment features are located on a forward leading edge of the hub.

In addition to one or more of the features described above, or as an alternative to any of the foregoing embodiments, the outer circumferential surface of the hub undulates.

In addition to one or more of the features described above, or as an alternative to any of the foregoing embodiments, the plurality of fan blades have a plurality of connecting members and at least one of the plurality of connecting members is secured to at least one of the plurality of attachment features located on the leading edge of the hub.

In addition to one or more of the features described above, or as an alternative to any of the foregoing embodiments, the plurality of fan blades each have a protective member secured to a leading edge of a corresponding one of the plurality of fan blades and wherein the protective member is secured to at least one of the plurality of attachment features located on the leading edge of the hub.

In addition to one or more of the features described above, or as an alternative to any of the foregoing embodiments, at least some of the plurality of attachment features are located on a trailing edge of the hub and the plurality of fan blades each have a protective member secured to a trailing edge of a corresponding one of the plurality of fan blades and wherein the protective member is secured to at least one of the plurality of attachment features located on the trailing edge of the hub.

In addition to one or more of the features described above, or as an alternative to any of the foregoing embodiments, each of the plurality of fan blades has a protective member secured to a trailing edge of a corresponding one of the plurality of fan blades and wherein the protective member secured to the trailing edge of the corresponding one of the plurality of fan blades is secured to at least one of the plurality of attachment features located on the trailing edge of the hub and wherein each of the plurality of fan blades also has a protective member secured to a leading edge of a corresponding one of the plurality of fan blades and wherein the protective member secured to the leading edge of the corresponding one of the plurality of fan blades is secured to at least one of the plurality of attachment features located on the leading edge of the hub.

In yet another embodiment, a method of securing a fan blade to a hub of a gas turbine engine is provided. The method including the steps of: inserting a plurality of pins through a plurality of attachment features located on an outer circumferential surface of the hub and a leading edge of the hub, wherein the plurality of pins secure a plurality of connecting members of the plurality of blades to the hub, wherein at least some of the plurality of the connecting members extend from a leading edge of each of the plurality of fan blades the a corresponding attachment feature located on the leading edge of the hub.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
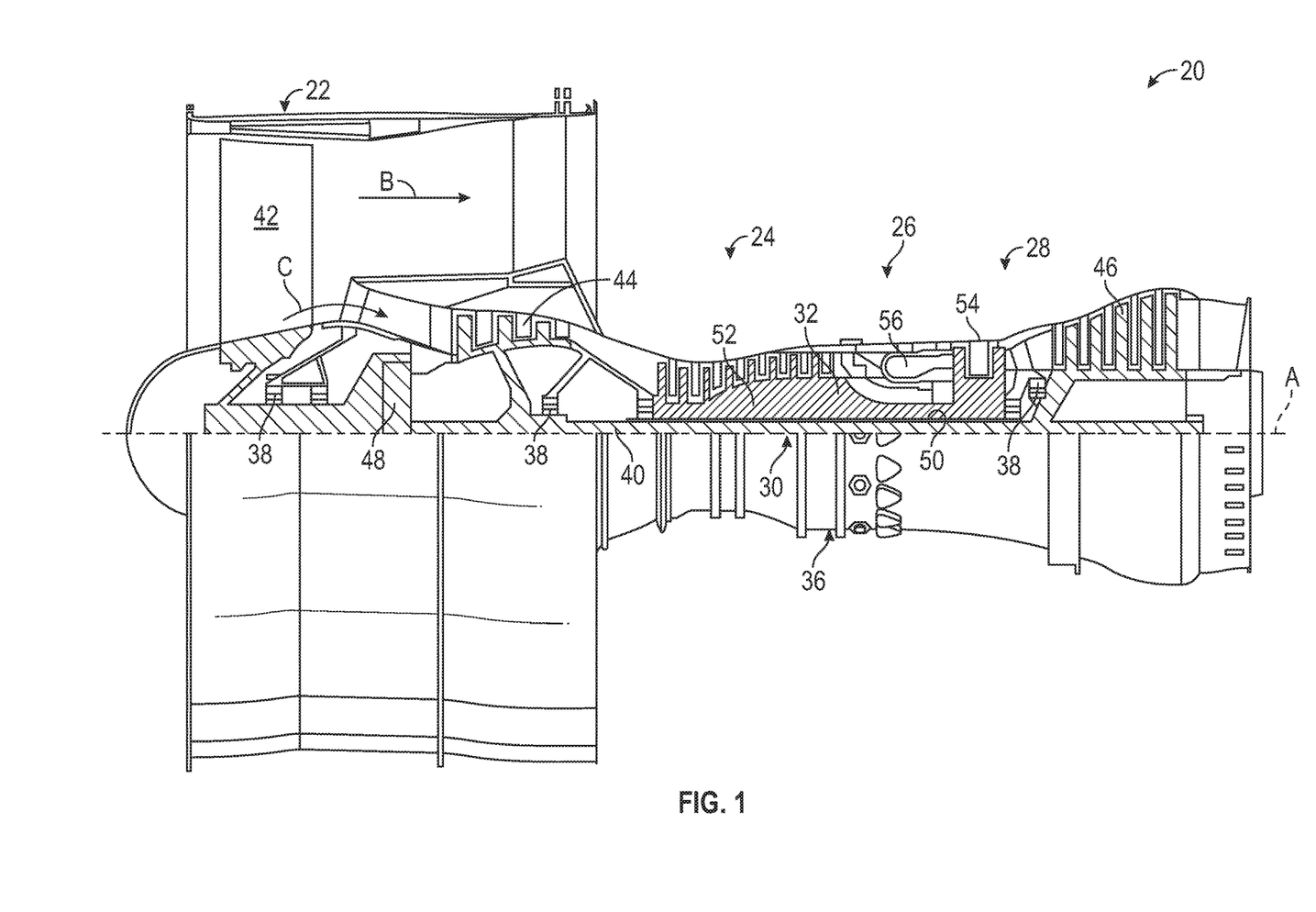
FIG. 1 is a partial cross sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine engine 20 between the high pressure compressor 52 and the high pressure turbine 54. An engine static structure 36 is arranged generally between the high pressure turbine 54 and the low pressure turbine 46.

The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 m/sec).

Figure 2:
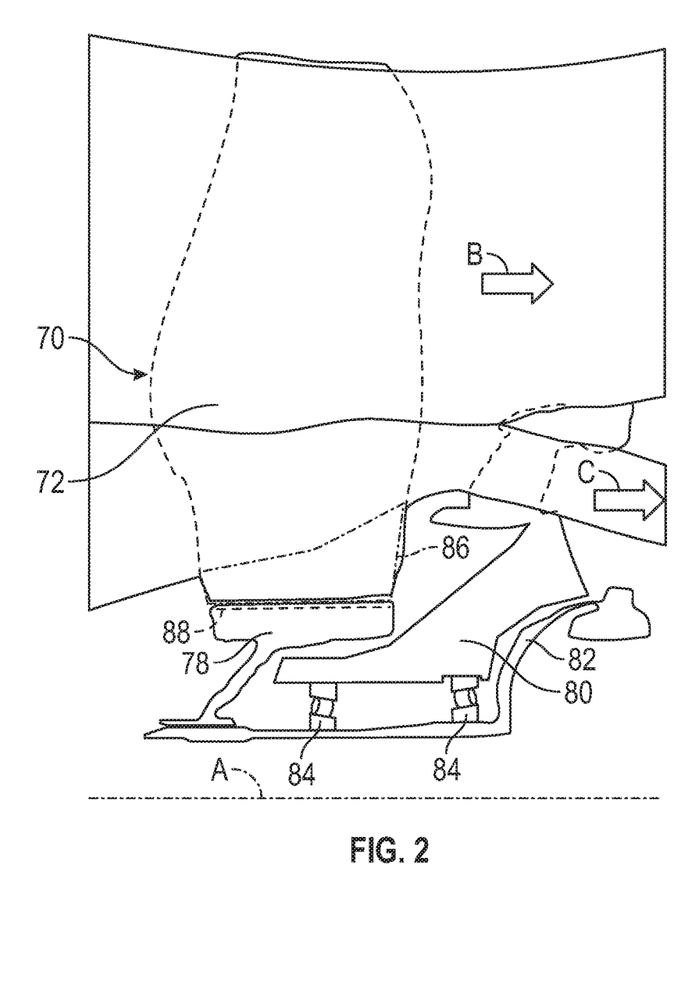
FIG. 2 is a schematic illustration of a fan blade of the fan of the gas turbine engine.
Figure 3:
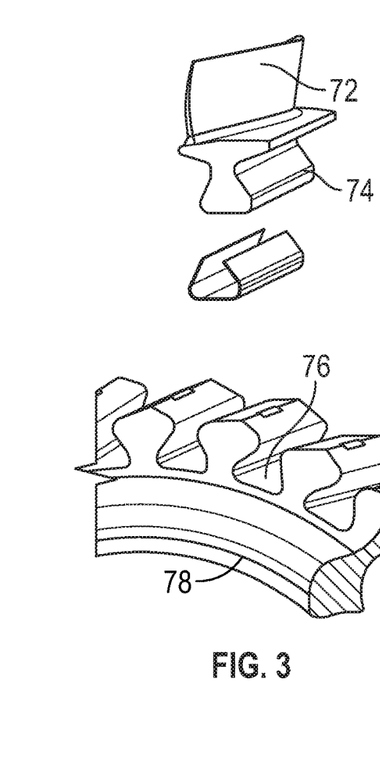
FIG. 3 is an exploded view of a fan blade and a rotor or hub of the gas turbine engine.

Referring now to FIGS. 2 and 3, a fan blade 70 of the fan 42 of the engine 20 is illustrated. As is known in the related arts, the fan 42 comprises a plurality of fan blades 70. The fan blade 70 also includes an airfoil 72 and a root or root portion 74. The root or root portion 74 is received within a slot or cavity 76 of a rotor, rotor disk, fan hub or hub 78 that rotates about axis A of the engine 20. Here root 74 is shown as a "dovetail" root.

Also illustrated in FIG. 2 is a portion of a static structure 80 the engine 20, a fan shaft 82 and roller bearings 84 located between the fan shaft 82 and the static structure 80. In one embodiment, the roller bearings 84 may be tapered roller bearings. Also illustrated in FIG. 2 is the bypass flow B and the core flow path C. A portion 86 of the fan blade 70, that is located below the flow paths B and C and at or above the blade to root interface may have a larger overall thickness due to structural requirements. This larger or thicker portion may create a containment issue in the event of a failure of the fan blade 70 due to an undesired operational event.

For a blade containment test under 14 CFR 33.94, the fan blade 70 is cut at the blade to dovetail interface represented by the dashed line 88. This releases at least portion 86 of the fan blade 70 into the illustrated flow paths B and C.

Figure 4:
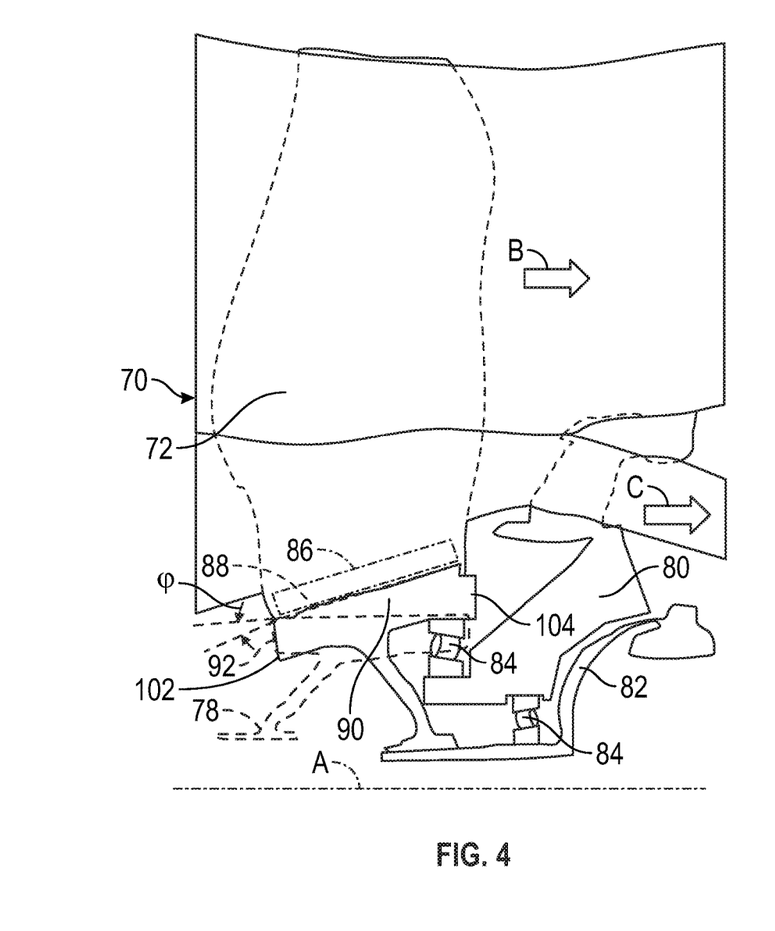
FIG. 4 is a schematic illustration of a fan blade of the fan of the gas turbine engine secured to a hub.
Figure 5:
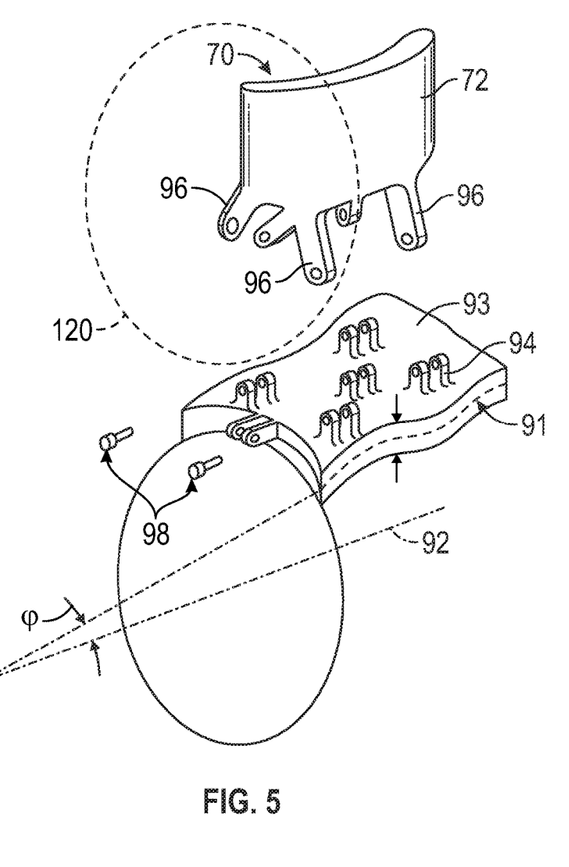
FIG. 5 is a partial perspective view of a fan blade secured to the hub.
Figure 6:
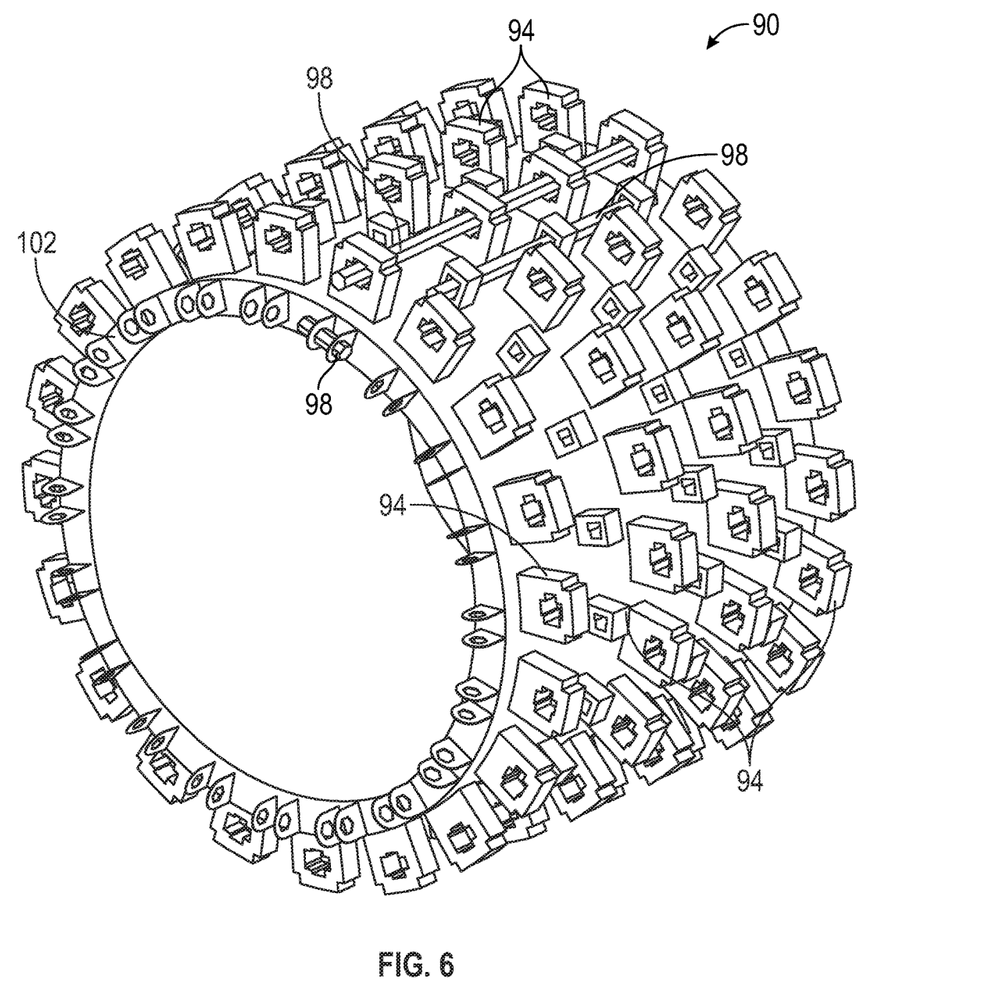
FIG. 6 is a perspective view of a hub in accordance with an embodiment of the present disclosure.
Figure 7:
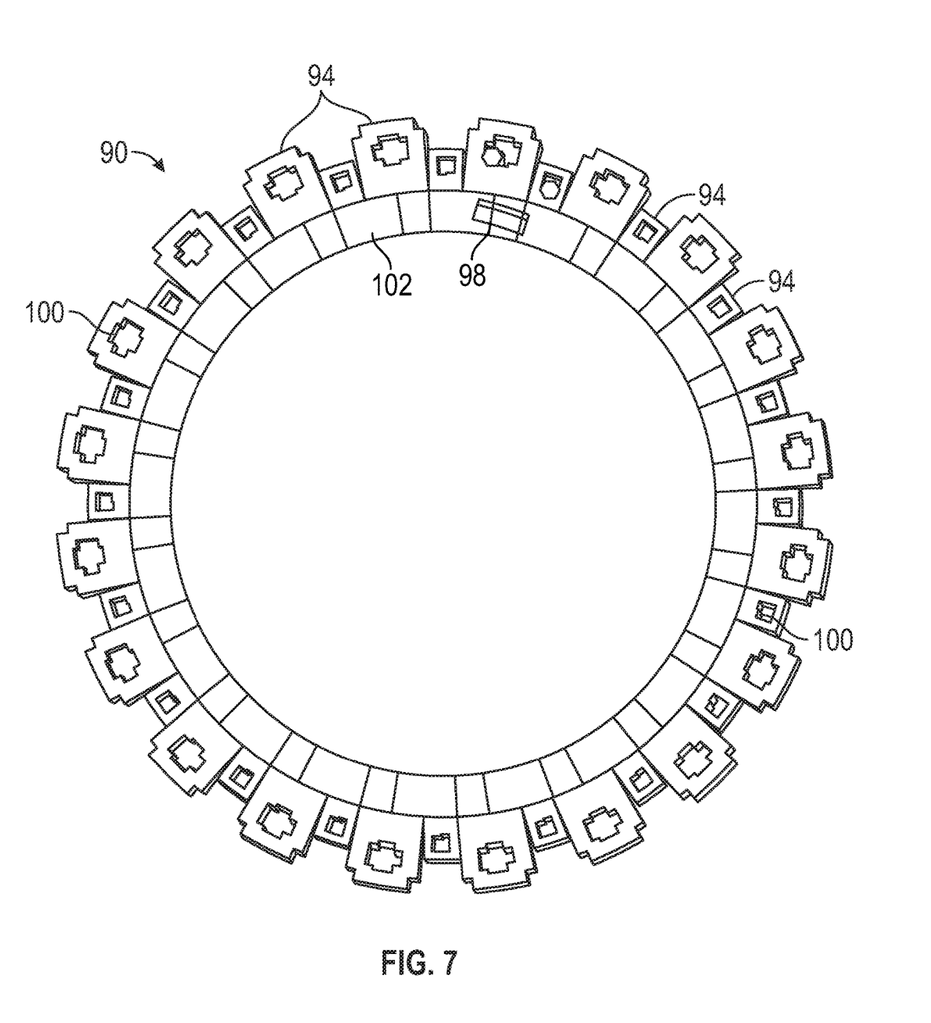
FIG. 7 is an end view of the hub illustrated in FIG. 6.
Figure 8:
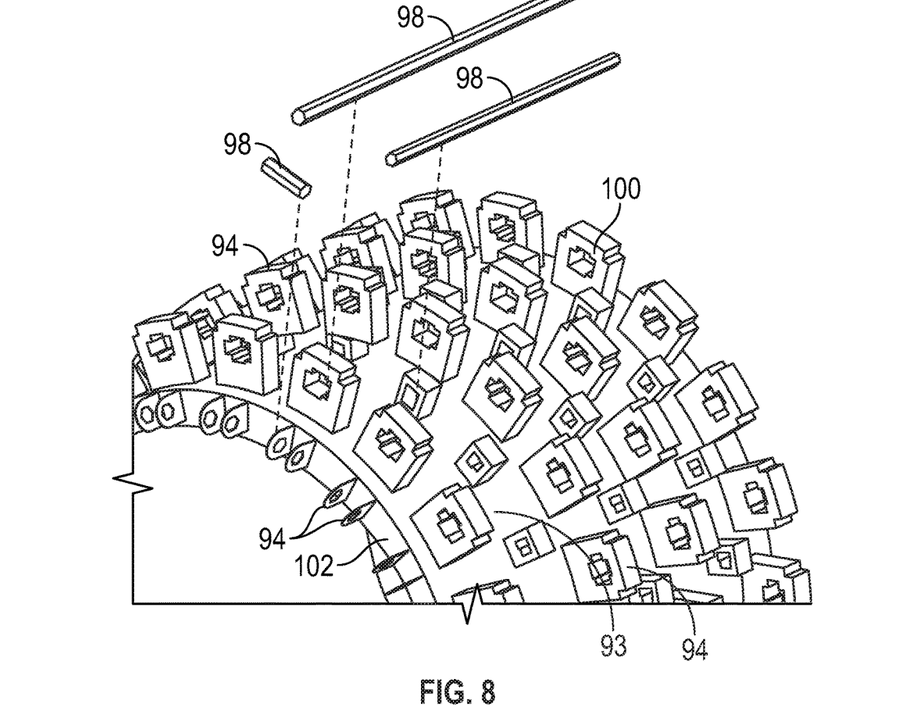
FIG. 8 is a partial perspective view of a hub and securement pins in accordance with one embodiment of the present disclosure.
Figure 9:
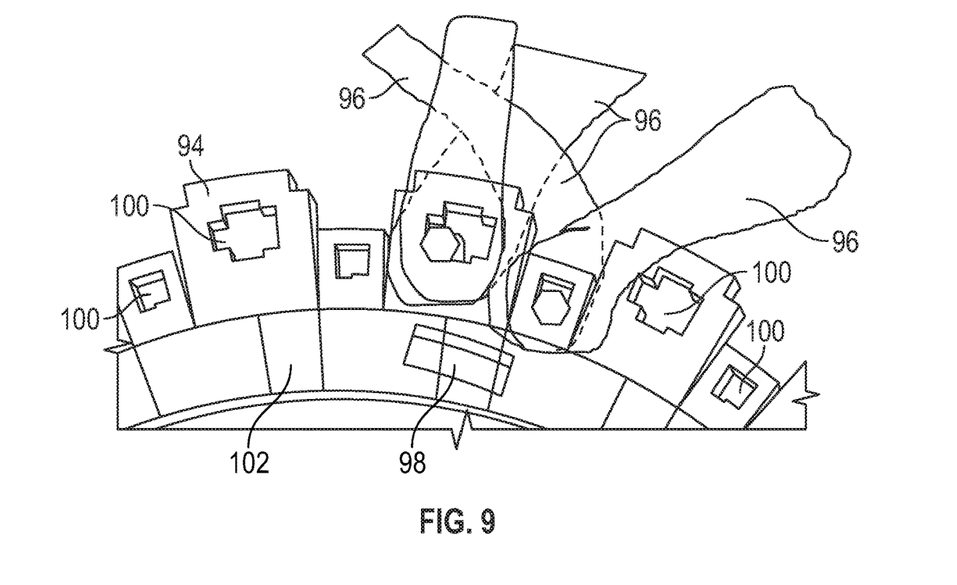
FIG. 9 is a partial end view of a hub with securement ligaments of the fan blades.
Figure 10A:
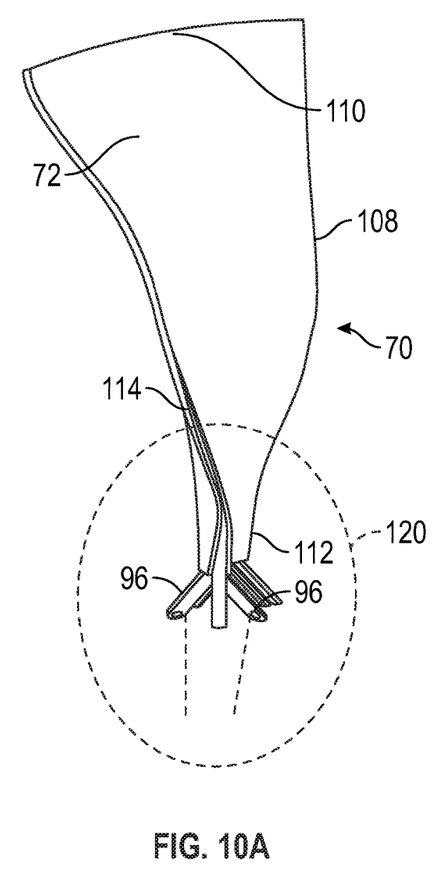
FIG. 10A is a perspective view of a blade in accordance with an embodiment of the present disclosure.
Figure 10B:
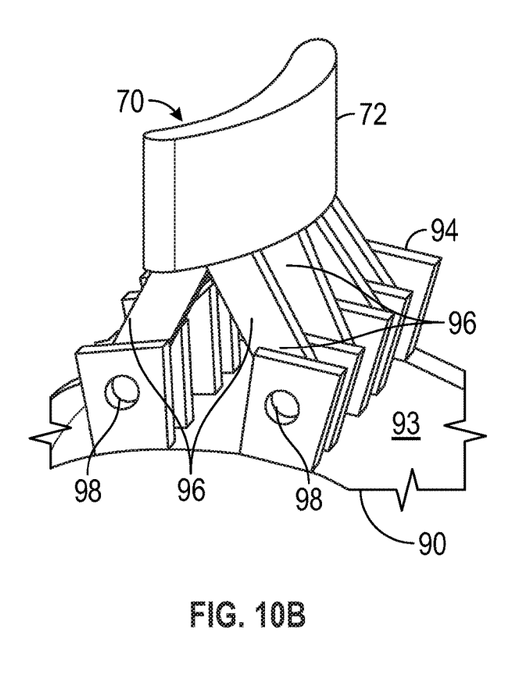
FIG. 10B is a partial view of a hub and a blade in accordance with an embodiment of the present disclosure.
Figure 10C:
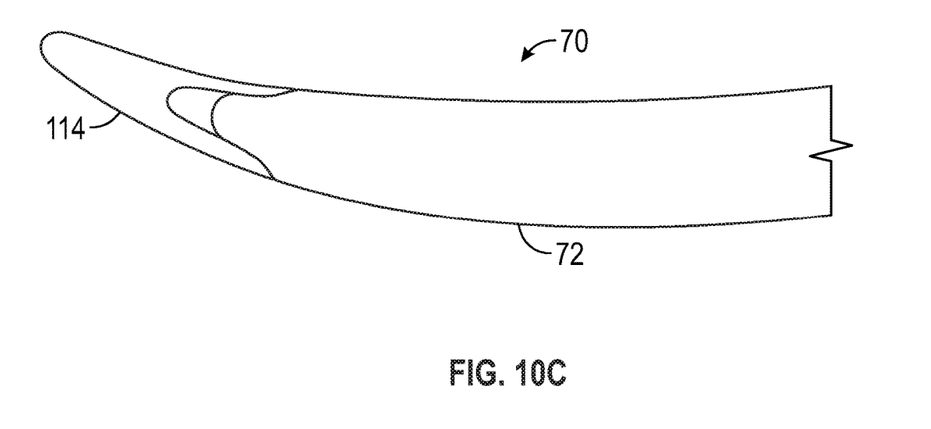
FIG. 10C is a partial cross-sectional view of a blade in accordance with an embodiment of the present disclosure.

Referring now to FIGS. 4 and 5, a hub or rotor 90 is illustrated. In one embodiment, the hub or rotor may be a coned hub or coned fan hub or coned rotor such that the hub or rotor angles upwardly in a radial direction with respect to axis A in a fore to aft direction as illustrated in the FIGS. The hub or rotor 90 has a leading edge 102 and a trailing edge 104. As used herein the leading edge 102 corresponds to the fore part of the hub and the trailing edge corresponds to the aft part of the hub. Thus and as the hub or rotor angles upwardly in a radial direction with respect to axis A in a fore to aft direction this may also be referred to as angling upwardly in a radial direction with respect to axis A from the leading edge 102 to the trailing edge 104. As used herein and as illustrated in the FIGS. a fore part of the hub 90 is closer to the fan 42 than an aft part of the hub 90 or in other words and as viewed in the attached FIGS. fore to aft is left to right when viewing FIG. 1.

In yet another embodiment, the hub or rotor may be parallel or have a uniform circumference with respect to axis A. In other words, the distance of an outer circumferential surface 93 of the hub or rotor extending between the leading edge 102 and a trailing edge 104 may be located at a uniform distance from the axis A.

Here, a line 91 which extends along a midline of the hub (coned or not coned) designates a mid-point between an inner and outer surface of the fan hub or rotor 90 or an average of the inner and outer surfaces. As illustrated and in the coned hub embodiment, the line has an angle φ with respect to line 92, which corresponds to line 88 in FIG. 2 (e.g., hub 78). In other embodiments, the line 92 is parallel to the axis A of the engine 20. As illustrated herein, the angle φ may vary as the midline 91 varies due to the curvature or undulation as well as the thickness of the hub or rotor 90. Thus and in one embodiment of a hub or rotor with a surface 93 that is parallel to axis 92, the outer surface 93 may undulate with respect to axis 92. In one embodiment, the thickness of the hub or rotor 90 may vary. As discussed above, the midline 91 of the hub or rotor 90 rotates about axis A of the engine.

In addition and as also illustrated, the cone angle φ of the hub or rotor 90 allows reconfiguration of the static structure 80, the shaft 82 and thus the bearing 84 closest the hub 90 may be relocated to an area that results in improved rotor or hub dynamics.

In order to secure the fan blade 70 to the hub or rotor 90, a plurality of attachment features 94 extend from surface 93 and the fan blade is secured thereto by a plurality of ligaments or connecting members 96 which are secured to the fan blade 70 at one end and extend to the attachment features 94 at the other end.

In one embodiment, the ligaments or connecting members 96 are secured to the attachment features 94 by a pin or pins 98. In one embodiment, pins 98 may be press fit into its corresponding opening in order to secure the ligaments or connecting members 96 to the hub 90. Of course, alternative methods of securement are considered to be within the scope of the present disclosure. Still further and as illustrated in at least FIGS. 6-9, the rotor or hub 90 and its surface 93, may have a plurality of attachment features 94 of varying sizes (e.g., height, width, length, etc.) and orientations. In one embodiment, each or at least a portion of the features have an opening 100 configured to receive a portion of a pin 98. In addition and similar to the attachment features 94, the pins may also have varying sizes. Still further and in one embodiment, some of the attachment features 94 may be located on a forward end 102 of the hub 90. In yet another embodiment, some of the attachment features 94 may be located on an aft end 104 of the hub 90. In yet another embodiment, the attachment features 94 may be located on both the forward end or leading edge 102 and the aft end 104 of the hub 90.

In any of the above embodiments, the attachment features 94 may be integrally formed with the hub 90 or separately secured thereto.

By providing a hub with a plurality of attachment features or support brackets 94 and securing the blade thereto with a plurality of ligaments or connecting members 96 and associated pins 98, the blade root and corresponding slots in the rotor can be removed. As such, this allows the cut line 88 for use in a blade containment test under 14 CFR 33.94, to be moved and portion 86 of the fan blade 70 is significantly smaller. By making portion 86 smaller, rotating imbalances are improved and the impact energy of a released blade into the fan containment case (FCC) is reduced.

Still further and by providing an undulating surface 93 as illustrated in at least FIG. 5, the stiffness/strength of each fan blade ligament attachment can be designed independently as well as allowing for the implementation of more than one Gaussian curvature in the design (e.g., conical hubs). By designing at least some of the attachment features 94 independently this the design is free from the constraints of a dove tail root configuration. In the dove tail root configuration, the design must have only one Gaussian curvature. In other words, if the design employs more than one Gaussian curvature the root will not be able to slide into the dovetail.

By varying the Gaussian curvature of the hub, the related blade design may also vary. As such, the hub and the blade securement thereto below the core flow path C can vary. This allows the blade attachment to be configured in order to account for centripetal forces or stresses encountered by the blade and/or areas of its securement to the hub.

Referring now to at least FIGS. 10A, 10C, 11 and 12, the fan blade 70 has a leading edge 106, a trailing edge 108, a tip portion 110 and a bottom or attachment portion 112. In one embodiment, a protective sheath 114 is secured to the leading edge 106 of the fan blade 70.

In order to reduce weight, the fan blades in some embodiments may be may be made out of aluminum, and to protect the leading edge from erosion, the protective sheath 114 may be formed from titanium. Although aluminum and titanium are disclosed other equivalent materials are completed to be within the scope of the present disclosure.

Figure 11:
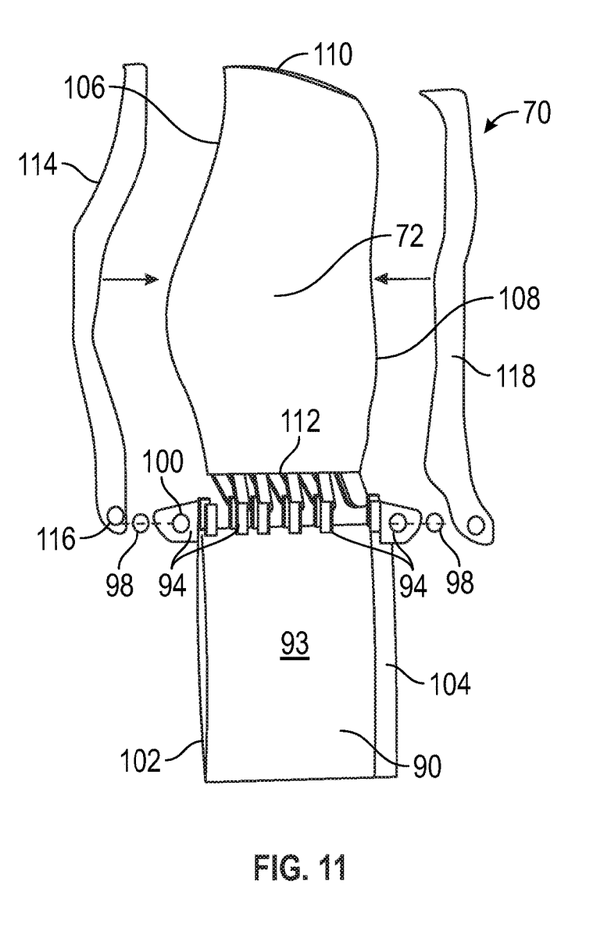
FIG. 11 is a side view illustrating a fan blade secured to a hub accordance with an embodiment of the present disclosure.
Figure 12:
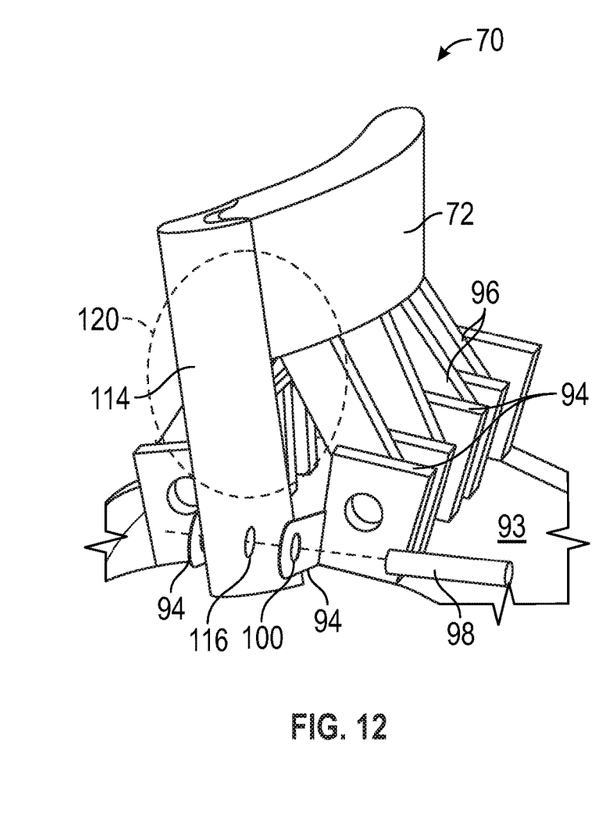
FIG. 12 is a partial perspective cross-sectional view illustrating a fan blade secured to a hub in accordance with an embodiment of the present disclosure.

As illustrated in at least FIGS. 11 and 12, the protective sheath 114 extends along the entire leading edge 106 from the tip portion 110 past the bottom or attachment portion 112 and is then secured to the attachment features 94 located at the leading edge 102 of the hub 90. As illustrated in FIG. 12 and in one non-limiting embodiment, the protective sheath 114 has an opening 116 that is aligned with openings 100 of the attachment features 94 located on either side of the protective sheath 114 at the leading edge 102 of the hub 90. Accordingly, pin 98 can be inserted into openings 100 and 116 in order to secure the protective sheath 114 to the leading edge of the hub 90.

In yet another embodiment, an attachment member or ligament member 96 may be located at the leading edge of the blade and this member is secured to the leading edge 102 of the hub. Here, this attachment member or ligament member 96 may be integrally formed with the blade 70. See for example, FIG. 5.

In addition and in another embodiment, the trailing edge 108 may also have a protective sheath 118 secured thereto. Similar to the leading edge, the protective sheath 118 of the trailing edge may extend from the tip 110 of the blade 70 past the attachment portion 112 and is secured to the attachment features 94 located on the aft end 104 of the hub 90.

In yet another embodiment, an attachment member or ligament member 96 may be located at the trailing edge of the blade and this member is secured to the trailing edge 104 of the hub. Here, this attachment member or ligament member 96 may be integrally formed with the blade 70.

In one embodiment, the blade 70 may have protective sheaths 114, 118 secured to both the leading edge 106 and the trailing edge 108. Alternatively, the may only have a protective sheath 114 located at the leading edge 106 or only have a protective sheath 118 located at the trailing edge 108 of the blade 70.

In accordance with various embodiments of the present disclosure, the hub 90 and blades 70 are configured such that dovetail mounted roots and corresponding slots are no longer used to secure the blades to the hub. By removing the root portion and corresponding slot, the need for a blade setback proximate to the leading edge of the airfoil 72 at its point of securement to the hub 90 is no longer necessary. In dovetail root designs, a blade setback is sometimes employed in the area depicted by the dashed lines 120 in at least FIGS. 10A and 12. Typically these setbacks are used to reduce stress gradients in the thin leading edge in order to withstand potential bird strikes and foreign object damage (FOD). As such and through the designs disclosed herein, the centrifugal loads and stresses acting on the leading and trailing edges of the fan blade can be reacted to through the use of the attachment of the bald and/or the protective sheath at the leading and trailing edges of the hub or rotor.

Figure 13:
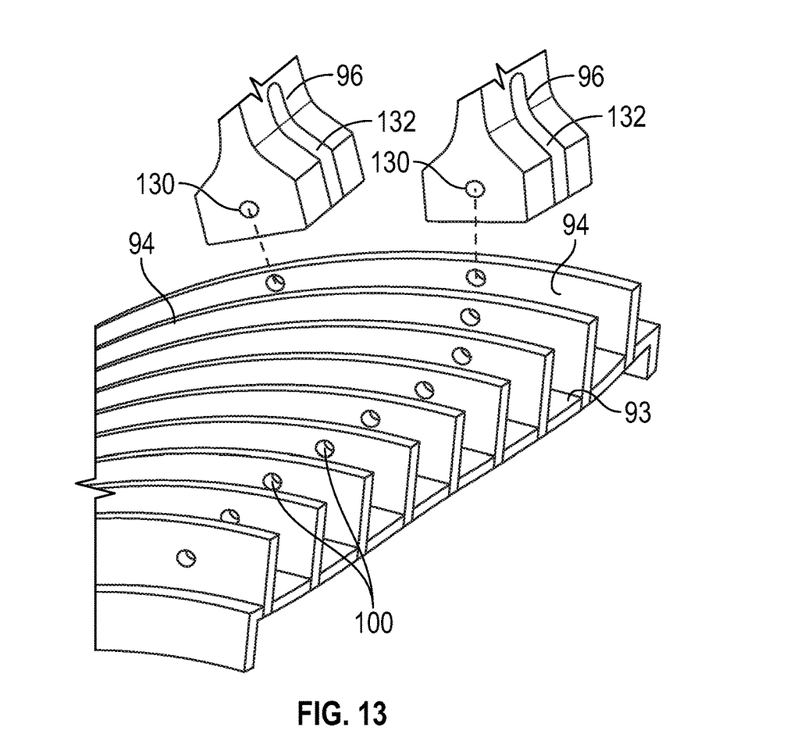
FIG. 13 is partial perspective cross-sectional view illustrating a hub in accordance with an alternative embodiment of the present disclosure.
Figure 14:
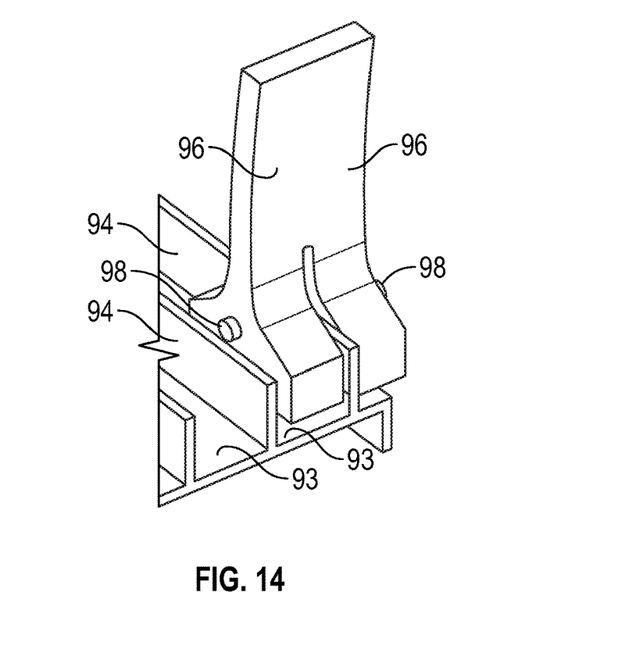
FIG. 14 is a partial perspective cross-sectional view illustrating a hub in accordance with yet another alternative embodiment of the present disclosure.

Referring now to FIGS. 13 and 14, another embodiment of the present disclosure is illustrated. In this embodiment, the attachment features 94 of the rotor or hub 90 are continuous walls or attachment features that extend continuously about the periphery of the hub 90. In this embodiment, the attachment features or walls 94 are spaced from each other in an axial direction as represented by axis A. In addition, the continuous walls 94 may have varying heights extending in a radial direction away from axis A and away from the surface 93. As mentioned above, the surface 93 may also undulate and/or hub 90 may be conical in shape in a fore to aft direction.

In one non-limiting embodiment, the walls or attachment features 94 may be formed in the hub 90 via a lathing process. As such, the hub may be placed on a turning machine or lathe and a cutting tool is used to remove surface material in order to form the walls or attachment features 94.

As mentioned above and in one embodiment, the walls or attachment features 94 may extend continuously about the hub 90. In yet another embodiment, the walls or attachment features may extend partially about hub 90 (e.g., not completely around) or some of the walls or attachment features 94 may extend completely around and some may not.

As illustrated, the ligaments or connecting members 96 have an opening 130 for receipt of pin or member 98 therein. In addition, the ligaments or connecting members 96 may also have a slot or opening 132 in order to receive a portion of wall 94 therein. Accordingly and as the ligaments or connecting members 96 are placed on a portion of wall 94 a portion of the wall or feature 94 is received in slot or opening 132. Once opening 130 is aligned with opening 100 a pin or member 98 is inserted therein in order to secure the ligaments or connecting members 96 to the hub 90. In this embodiment, the ligaments or connecting members 96 will have a portion on either side of wall or feature 94.

In an alternative embodiment and as illustrated in at least FIG. 14, the ligaments or connecting members 96 are located on opposite sides of wall or feature 94. In this embodiment, a pair of ligaments or connecting members 96 are secured to opposite sides of wall or feature 94 via pin 98.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine, comprising:
    a fan hub;
    a plurality of blades secured to the fan hub via a plurality of attachment features located on an outer circumferential surface of the hub, wherein at least some of the plurality attachment features are axially aligned with each other and at least some of the plurality of attachment features are off set from each other, and wherein each of the plurality of attachment features have an opening configured to receive a portion of a pin for securing the plurality of blades to the fan hub; and
    wherein at least some of the plurality of attachment features are located on a forward leading edge of the hub.

2. The engine as in claim 1, wherein the outer circumferential surface of the hub undulates.

3. The engine as in claim 1, wherein the plurality of fan blades have a plurality of connecting members and at least one of the plurality of connecting members is secured to at least one of the plurality of attachment features located on the leading edge of the hub.

4. The engine as in claim 1, wherein the plurality of fan blades each have a protective member secured to a leading edge of a corresponding one of the plurality of fan blades and wherein the protective member is secured to at least one of the plurality of attachment features located on the leading edge of the hub.

5. The engine as in claim 1, wherein at least some of the plurality of attachment features are located on a trailing edge of the hub and the plurality of fan blades each have a protective member secured to a trailing edge of a corresponding one of the plurality of fan blades and wherein the protective member is secured to at least one of the plurality of attachment features located on the trailing edge of the hub.

6. The engine as in claim 1, wherein each of the plurality of fan blades has a protective member secured to a trailing edge of a corresponding one of the plurality of fan blades and wherein the protective member secured to the trailing edge of the corresponding one of the plurality of fan blades is secured to at least one of the plurality of attachment features located on the trailing edge of the hub and wherein each of the plurality of fan blades also has a protective member secured to a leading edge of a corresponding one of the plurality of fan blades and wherein the protective member secured to the leading edge of the corresponding one of the plurality of fan blades is secured to at least one of the plurality of attachment features located on the leading edge of the hub.

7. A hub for a fan of a gas turbine engine, comprising:
    a plurality of attachment features located on an outer circumferential surface of the hub, wherein at least some of the plurality attachment features extend radially away from the outer circumferential surface and are axially aligned with each other and at least some of the plurality of attachment features extending radially away from the outer circumferential surface and are off set from each other, and wherein the plurality of attachment features have an opening configured to receive a portion of a pin; and
    wherein at least some of the plurality of attachment features are located on a forward leading edge of the hub.

8. The hub as in claim 7, wherein the plurality of attachment features located on the forward leading edge of the hub extend axially away from the leading edge.

9. The hub as in claim 8, wherein at least some of the plurality of attachment features are located on a trailing edge of the hub and the least some of the plurality of attachment features located on the trailing edge of the hub extend axially from the trailing edge of the hub.

10. The hub as in claim 7, wherein at least some of the plurality of attachment features are located on a trailing edge of the hub.

11. The hub as in claim 10 in combination with at least one fan blade, wherein the at least one fan blade has a protective member secured to a trailing edge of the at least one fan blade and wherein the protective member is secured to at least one of the plurality of attachment features located on the trailing edge of the hub.

12. The hub as in claim 10 in combination with at least one fan blade, wherein the at least one fan blade has a protective member secured to a trailing edge of the at least one fan blade and wherein the protective member is secured to at least one of the plurality of attachment features located on the trailing edge of the hub and wherein the at least one fan blade has a protective member secured to a leading edge of the at least one fan blade wherein the protective member secured to the leading edge of the at least one fan blade is secured to at least one of the plurality of attachment features located on the leading edge of the hub.

13. The hub as in claim 7, wherein the plurality of attachment features located on the outer circumferential surface of the hub are a plurality of walls axially spaced from each other that extend continuously about the outer circumferential surface of the hub.

14. The hub as in claim 7, wherein the hub is conically shaped.

15. The hub as in claim 7, wherein the outer circumferential surface of the hub has at least two different Gaussian curvatures.

16. The hub as in claim 7, wherein the outer circumferential surface of the hub undulates.

17. The hub as in claim 7 in combination with at least one fan blade, wherein the at least one fan blade has a plurality of connecting members extending from a bottom portion of the fan blade, the plurality of connecting members being configured to be secured to the plurality of attachment features by a pin.

18. The hub as in claim 7 in combination with at least one fan blade, wherein the at least one fan blade has a plurality of connecting members and at least one of the plurality of connecting members being secured to at least one of the plurality of attachment features located on the leading edge of the hub.

19. The hub as in claim 7 in combination with at least one fan blade, wherein the at least one fan blade has a protective member secured to a leading edge of the at least one fan blade wherein the protective member is secured to at least one of the plurality of attachment features located on the leading edge of the hub.

20. A method of securing a fan blade to a hub of a gas turbine engine, comprising:
   inserting a plurality of pins through a plurality of attachment features located on an outer circumferential surface of the hub and a leading edge of the hub, wherein the plurality of pins secure a plurality of connecting members of the plurality of blades to the hub, wherein at least some of the plurality of the connecting members extend from a leading edge of each of the plurality of fan blades the a corresponding attachment feature located on the leading edge of the hub.

* * * * *